United States Patent [19]

Oldershaw et al.

[11] 4,044,389

[45] Aug. 23, 1977

[54] METHOD AND APPARATUS FOR MEASURING THE SPEED AT WHICH A TAPE WAS RECORDED

[75] Inventors: Reginald W. Oldershaw, Los Altos; Edwin S. Busby, Jr., Menlo Park, both of Calif.

[73] Assignee: Ampex Corporation, Redwood City, Calif.

[21] Appl. No.: 668,677

[22] Filed: Mar. 19, 1976

[51] Int. Cl.² .................... G11B 15/52; G11B 15/46; G11B 15/54

[52] U.S. Cl. ....................................................... 360/73

[58] Field of Search ...................... 360/70, 73; 358/8

[56] References Cited

U.S. PATENT DOCUMENTS

| | | | |
|---|---|---|---|
| 3,702,382 | 11/1972 | Breikss | 360/73 |
| 3,805,286 | 5/1974 | Kavanagh et al. | 360/73 |
| 3,950,735 | 5/1976 | Patel | 360/73 |

Primary Examiner—Bernard Konick
Assistant Examiner—Don McElheny
Attorney, Agent, or Firm—George B. Almeida

[57] ABSTRACT

A tape speed measuring circuit for use with quadruplex video recorder/reproducers, which identifies the speed at which the recording was made to allow automatically switching to the correct speed upon playback. The circuit measures the ratio of control track frequency relative to the capstan tach frequency to obtain the recorded tape speed. A commutating filter means responsive to the capstan tach signal allows the accurate extraction of the desired control track signal component at all tape speeds. Divider means counts the number of tach pulses received during a selected time period. If the number of pulses is more or less than a pre-selected quantity, a high or low logic level respectively is generated commensurate with the standard 15 or 7½ inches/second recorded tape speed.

13 Claims, 2 Drawing Figures

FIG_1

4,044,389

METHOD AND APPARATUS FOR MEASURING THE SPEED AT WHICH A TAPE WAS RECORDED

BACKGROUND OF THE INVENTION

1. Field

The invention relates to video tape recorder/reproducer speed control circuits, and particularly to a speed measuring circuit for identifying the speed at which the tape was previously recorded.

2. Prior Art

Tape speed on playback is normally set by manual means on video tape recorder/reproducers (VTR) since in the past most television stations operated at the standard tape speed of 15 inches/second (ips). However, since video tape has become more expensive, and has been improved to allow broadcast quality recording at video bandwidths with slower tape speeds, a larger number of broadcasters are employing the 7½ ips standard. As a result, a mixture of tapes recorded at both 7½ and 15 ips are being used, and an automatic switching method is desirable to preclude operator error during playback of the tapes.

The pre-recorded control track on a video tape is an expeditious means for sensing the speed used for recording the tape. However, on quadruplex VTRs the standard control track is a composite signal of multiple frequencies and includes a 240 Hz signal with a large component of third harmonic distortion, frame pulses, etc. Thus it is difficult to extract the 240 Hz signal recorded in the composite control track with any degree of accuracy, over the range of tape speeds encountered when rapidly moving tape.

SUMMARY OF THE INVENTION

The present invention provides a tape speed measuring circuit which circumvents the problems associated with extracting a precise control track signal over the full range of operating speeds, while allowing instant identification, upon playback, of the speed at which the tape was recorded. To this end, the control track is divided down to frame rate which provides an averaging period. During each of the time periods, a selected number of capstan tach pulses will be counted for a 15 ips recording, which is greater than the number of pulses which are counted for a 7½ ips recording. If a threshold pulse count is selected halfway between the number of pulses counted for a 15 ips recording and a 7½ ips recording, counting the number of pulses during tape motion will provide means for determining the recording speed. To this end, a divider counts the number of tach pulses during playback, whereby if the number exceeds the threshold count the recording was made at 15 ips, and vice versa. A resulting logic level output is then utilized to automatically set the speed of the VTR upon playback of the video tape.

DESCRIPTION OF THE PREFERRED EMBODIMENTS

The measuring circuit of the invention utilizes the relationship of the quadruplex VTR that the capstan tach is 3.84 kHz at 15 ips playback speed. This is 16 times the control track frequency of 240 Hz. At 7½ ips playback speed, the capstan tach frequency is 1.92 kHz, or 8 times the control track frequency. By measuring the ratio of control track frequency relative to the capstan tach frequency, the recorded tape speed can be determined.

Although the invention is herein described with respect to a quadruplex VTR employing a 525-line NTSC format and associated control track, tach, etc., frequencies, it is to be understood that the concept can be employed with other video, audio, etc., recorder/reproducers having multiple frequency control tracks, and/or with 625-line PAL or SECAM formats.

Figure 1:
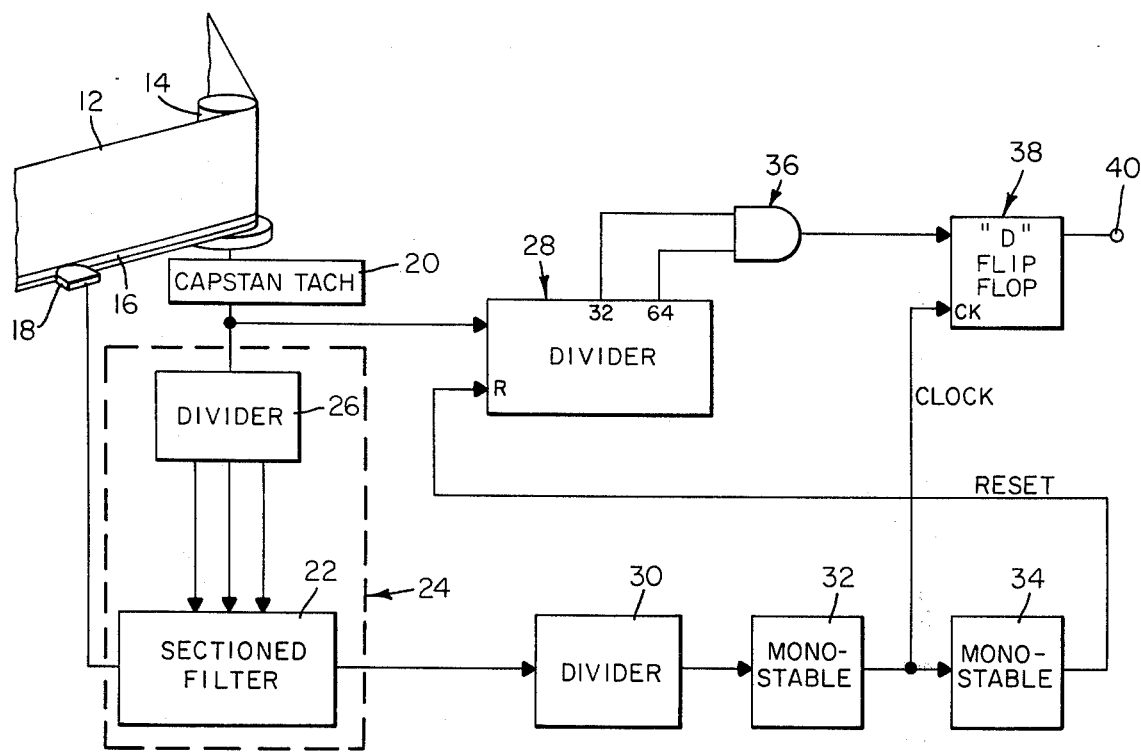
FIG. 1 is a block diagram of an embodiment of the invention combination.

Referring to FIG. 1, there is shown a section of video tape 12 which is driven via a capstan 14. A standard quadruplex control track 16 is recorded on the video tape 12 and is read via a control track head 18. A capstan tach means 20 is coupled to the capstan and generates a tach signal indicative of the rotation of the capstan 14. The control track head 18 generates a control track signal indicative of the movement of the video tape past the VTR head means (not shown). The control track signal is introduced to a multiple capacitor filter 22 of a commutating filter means 24. The tach signal is introduced to a divide-by-16 divider 26 of the commutating filter means 24, as well as to a divider 28. The commutating filter means 24 is described more fully in FIG. 2, as well as in the articles in "ELECTRONIC DESIGN", Vol. 16, Aug. 2, 1974, pages 96–101, and Vol. 23, Nov. 8, 1974, pages 116–120.

The control track signal is not a pure sine wave, but is instead the composite of a 240 Hz frequency recorded at tape saturation which causes severe third harmonic distortion, with the addition of a frame pulse at the frame rate. Therefore, the commutating filter means 24 provides a filter which will track the control track signal at all tape speeds. As shown in FIG. 1, the filter is clocked by the capstan tach signal via divider 26. The resulting filtered control track signal is introduced to a divide-by-8 divider 30, which generates a 30 Hz frame rate which, in turn, is delivered to a monostable multivibrator 32 for generating a 5 microsecond pulse. A second monostable multivibrator 34 is coupled to multivibrator 32 and generates a second 5 microsecond pulse.

AND gate 36 is coupled to the 32 and 64 count outputs of divider 28 and thence to the input of a "D" type flip-flop 38. The flip-flop 38 functions as a memory, which remembers its last state until clocked again via the 5 microsecond pulse from the monostable multivibrator 32. The divider 28 is reset via the 5 microsecond pulse from the monostable 34 at the end of the averaging period during which tach pulses are being counted via divider 28. The output of flip-flop 38 is delivered to output terminal 40, and comprises a high or low logic level representative of the standard 15 or 7½ ips recording tape speed, respectively.

By way of example, during an averaging period selected by dividing down the control track signal via the divider 30, there should be 128 capstan tach pulses counted by divider 28 if the video tape 12 was recorded at 15 ips, or 64 tach pulses if the tape was recorded at 7½ ips. The threshold count is selected as half-way between the 128 and 64 number of tach pulses, or at 96 pulses. If the divider 28 counts a number of tach pulses during the averaging period which exceeds 96, a high logic level is clocked into the "D" flip-flop 38, thereby identifying a standard 15 ips recording. If the number of counts in an averaging period is less than 96 tach pulses, a low logic level is clocked into the flip-flop 38, identifying a standard 7½ ips recording. The averaging period is determined by the clock to the memory flip-flop 38, and is reset via the reset pulses from monostable 34 to the divider 28.

Figure 2:
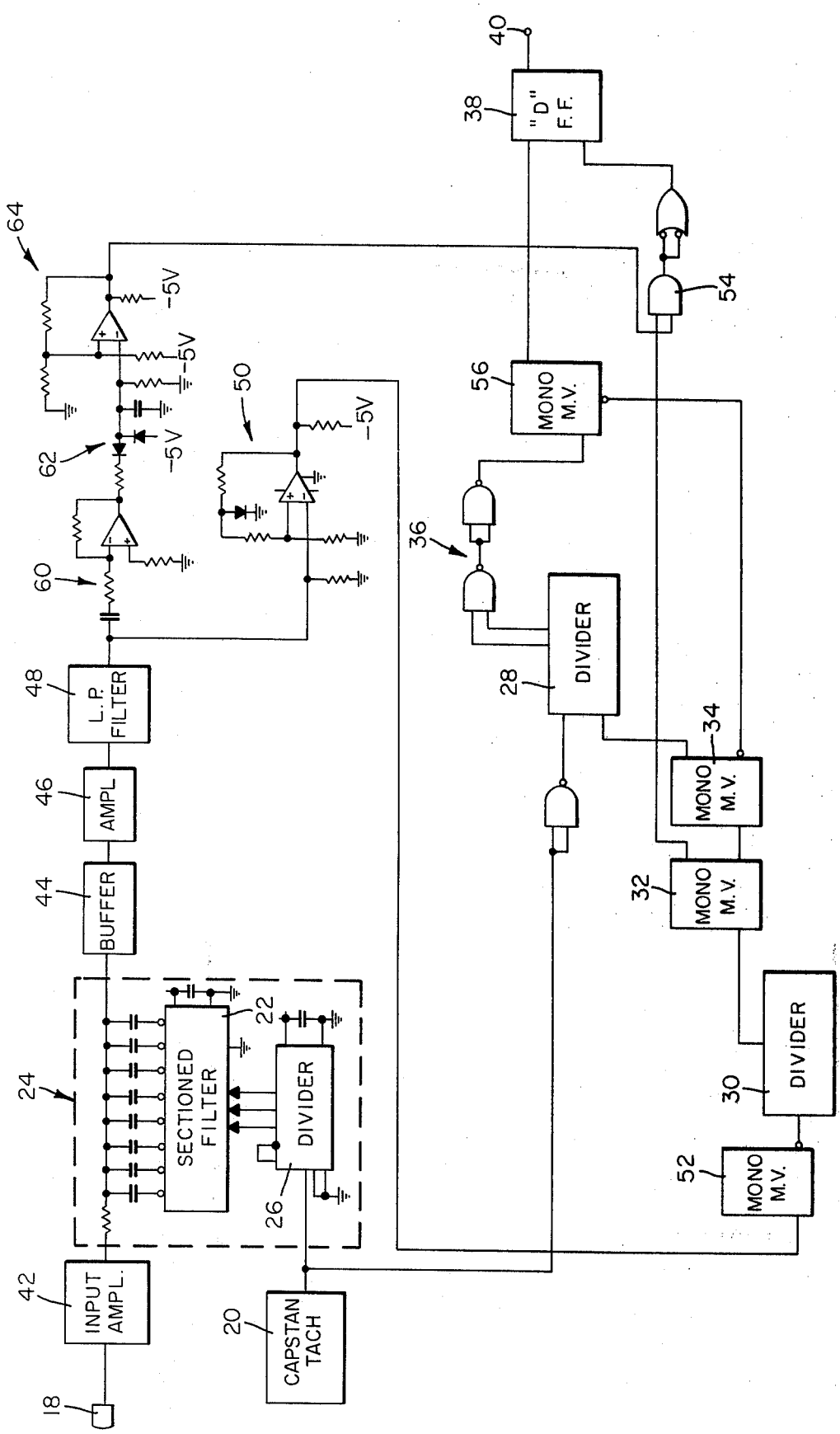
FIG. 2 is a schematic diagram of the circuit of FIG. 1.

FIG. 2 shows in greater detail the schematic diagram of the circuit of FIG. 1. The control track signal is introduced via head 18 to the sectioned filter 22 of the commutating filter means 24 via an input amplifier 42. The resulting sampled control track signal is introduced to a buffer 44 defined by a voltage follower circuit, and thence to an amplifier 46. A low pass filter 48 with frequency characteristics outside the band pass of the control track signal removes switching noise introduced via the commutating filter means 24. The filtered control track signal is then introduced to a squarer circuit 50, which functions as a zero crossing detector for generating a square wave from the crossover points of the filtered control track signal sine wave, and thence to a monostable multivibrator 52 to provide a clean pulse to the divider 30. The latter is coupled to the multivibrators 32, 34, wherein multivibrator 32 provides the clock pulse to the flip-flop 38 via an AND gate 54. Multivibrator 34 provides a clear pulse to a monostable multivibrator 56, which acts as a latch circuit. The pins of divider 28 corresponding to 32 and 64 counts are coupled to AND gate 36, which herein comprises a pair of AND gates in series, coupled in turn to the monostable multivibrator 56. The latter is coupled to the flip-flop 38 and thence to the output terminal 40.

The filtered control track signal from low pass filter 48 is introduced to the AND gate 54 via AC coupling 60, detector diodes 62 for providing peak detection of the signal, and a threshold detector 64. The components 62, 64 provide means for detecting the absence of the control track, thereupon disabling the AND gate 54 and the flip-flop 38, to maintain the latter in its last experienced state.

We claim:

1. A method for measuring the standard recording speeds of a tape in a tape recorder/reproducer upon motion of the tape, wherein the recorder/reproducer includes a capstan tach for providing tach pulses and a multiple frequency control track recorded on the tape, comprising the steps of;
    extracting a selected control track frequency from the control track;
    generating a selected control track averaging period in response to the capstan tach which period is a function of the control track frequency;
    generating a predetermined count of the tach pulses commensurate with the control track averaging period, which count is a function of a capstan tach frequency;
    measuring the ratio of the capstan tach frequency relative to the control track frequency; and
    generating logic levels indicative of the ratio measured and thus of the recording tape speed.

2. The method of claim 1 further including the step of;
    selecting a threshold count which when exceeded provides a first logic level indicative of a first standard recording speed, and when not exceeded provides a second logic level indicative of a second speed.

3. The method of claim 2 wherein the step of generating an averaging period further includes the step of;
    extracting the selected component of the control track signal from the tape while excluding all but the selected component, in response to the capstan tach over the full range of tape operating speeds; and
    the step of measuring further includes the step of;
    counting the number of capstan tach pulses within the averaging period to determine if the number is greater or less than the selected threshold count.

4. The method of claim 3 wherein the step of extracting the control track signal further includes sequentially connecting a plurality of capacitors at or near an integer multiple of the desired control track signal in response to the capstan tach, to extract only the selected component of the control track defining a filtered control track signal.

5. A tape speed measuring circuit for identifying the standard recording speeds of a tape in a tape recorder/reproducer upon motion of the tape, wherein the recorder/reproducer includes a capstan tach for providing tach pulses, and a multiple frequency control track recorded on the tape, comprising the combination of;
    means associated with the control track and responsive to the capstan tach for extracting a selected frequency from the multiple frequency control track while generating a control track averaging period corresponding to a selected number of cycles of the control track;
    means associated with the capstan tach for generating a predetermined count of tach pulses commensurate with the control track averaging period; and
    means operatively coupled to both the above means for generating logic levels indicative of the ratio of the capstan tach count to the control track frequency and thus of the recording speed of the tape.

6. The measuring circuit of claim 5 wherein the means associated with the capstan tach includes tach divider means coupled to the capstan tach for counting the number of tach pulses.

7. The measuring circuit of claim 6 wherein the means associated with the capstan tach further includes threshold count setting means for receiving the tach pulses counted by the tach divider means and for generating an averaging period of the tach pulses commensurate with the control track averaging period.

8. The measuring circuit of claim 7 wherein the threshold count setting means includes AND gate means for generating the averaging period of the tach pulses.

9. The measuring circuit of claim 8 wherein the means associated with the control track comprises commutating filter means formed of a selected number of capacitors, wherein the capstan tach sequentially connects the capacitors at or near an integer multiple of the desired control track signal to exclude all by the extracted selected frequency of the multiple frequency control track.

10. The measuring circuit of claim 9 wherein the means associated with the control track further includes control track divider means coupled to the commutating filter means for dividing down the filtered control track signal to define the control track averaging period during which the number of tach pulses are counted by the tach divider means.

11. The measuring circuit of claim 10 further including pulse forming means coupled to the control track divider means for generating selected clock and reset pulses.

12. The measuring circuit of claim 11 wherein the means operatively coupled to generate logic levels includes flip-flop means coupled to the AND gate means and responsive to the pulse forming means clock pulses to generate a high logic level indicative of one standard recording speed when the number of tach pulses is in excess of the threshold count, and a low logic level indicative of a second standard recording speed when the number of tach pulses is less than the threshold count.

13. The measuring circuit of claim 12 further including signal detecting means for maintaining the existing state of the flip-flop means in the absence of the control track signal.

* * * * *